United States Patent [19]

Onodera

[11] 4,006,385
[45] Feb. 1, 1977

[54] HORIZONTAL DEFLECTION CIRCUIT

[75] Inventor: Toshio Onodera, Kamakura, Japan

[73] Assignee: Sony Corporation, Tokyo, Japan

[22] Filed: Nov. 17, 1975

[21] Appl. No.: 632,807

[30] Foreign Application Priority Data

Nov. 29, 1974 Japan .............................. 49-138012

[52] U.S. Cl. .............................. 315/400; 315/370; 315/408

[51] Int. Cl.² ..................... H01J 29/70; H01J 29/76

[58] Field of Search .......... 315/400, 408, 370, 387, 315/399, 405

[56] References Cited

UNITED STATES PATENTS 3,211,946  10/1965  Bridges .............................. 315/408

Primary Examiner—Malcolm F. Hubler
Assistant Examiner—David Leland
Attorney, Agent, or Firm—Lewis H. Eslinger; Alvin Sinderbrand

[57]  ABSTRACT

A horizontal deflection circuit arrangement in which a saturable reactor operating as a variable impedance element is provided in the path of a horizontal deflection current flowing through a horizontal deflection coil for stabilizing the horizontal deflection current against fluctuations of the frequency of a horizontal drive signal for a horizontal output switching device, thereby to keep a suitable horizontal size of a raster made by the beam scan caused by the deflection current. The saturable reactor is supplied with a control signal varying in response to variations in the frequency of the horizontal drive signal to control the impedance thereof so as to compensate for the variations of the horizontal deflection current.

6 Claims, 2 Drawing Figures

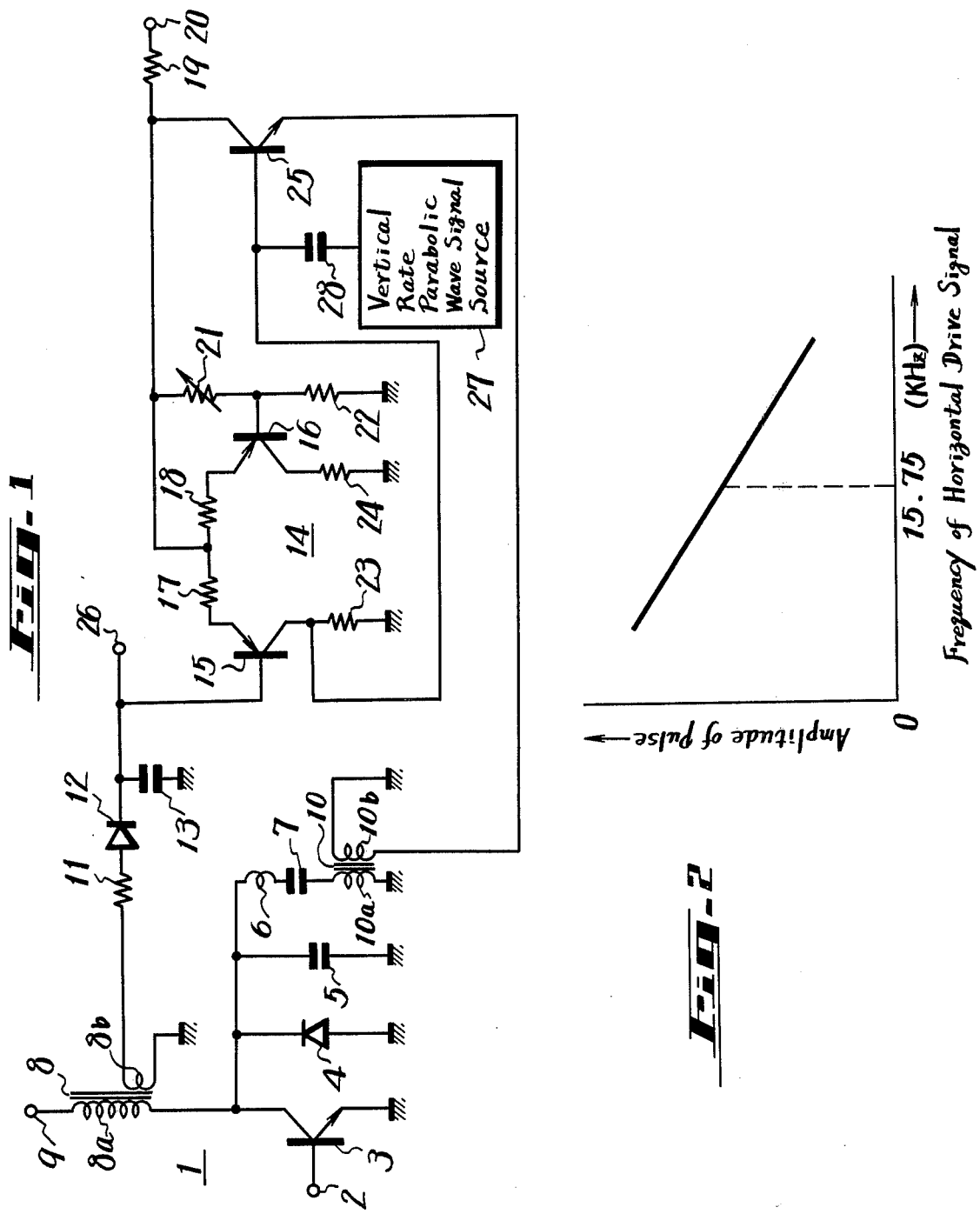

HORIZONTAL DEFLECTION CIRCUIT

BACKGROUND OF THE INVENTION

1. Field of the Invention

This invention relates generally to television receivers, and more particularly to horizontal deflection circuit arrangements of television receivers including a horizontal deflection coil for scanning an electron beam in a cathode ray tube.

2. Description of the Prior Art

In the reproduction of a television signal, particularly, such a television signal as once recorded and then reproduced by a video tape recording and/or reproducing apparatus, a television receiver is often supplied with a television signal containing a horizontal synchronizing signal fluctuating in its frequency in the cause of, for example, deviation of the tape speed of the video tape recording and/or reproducing apparatus.

Generally, a horizontal deflection circuit of a television receiver is provided with an AFC (Automatic Frequency Control) circuit which controls a horizontal oscillator with an output of a phase comparator comparing the phase of the output of the horizontal oscillator to the phase of the horizontal synchronizing signal of the received television signal to carry the output of the horizontal oscillator in synchronism with the horizontal synchronizing signal.

Accordingly, when the frequency of the horizontal synchronizing signal of the received television signal fluctuates from a predetermined correct frequency (15.75KHz), the frequency of the output of the horizontal oscillator fluctuates, and therefore the frequency of a drive signal for a horizontal output switching device by which a horizontal deflection current is supplied to the deflection coil, also fluctuates.

In conventional television receivers, even if such fluctuations occur, it is possible to get a reproduced picture. However when the frequency of the drive signal fluctuates, the horizontal size of the raster is undesirably varied, that is, if the frequency of the drive signal decreases, the horizontal deflection current increases and accordingly the horizontal size of the raster becomes larger and on the contrary if the frequency of the drive signal increases, the horizontal deflection current decreases and accordingly the horizontal size of the raster becomes smaller.

SUMMARY OF THE INVENTION

In accordance with the present invention, an improved horizontal deflection circuit is disclosed. In this improved circuit, a saturable reactor is connected in reries with a horizontal deflection coil and the impedance of the saturable reactor is controlled so as to stabilize the horizontal deflection current flowing through the horizontal deflection coil even when the frequency of a driving signal for a horizontal output switching device is fluctuated. This results in that a suitable horizontal size of a raster made by the beam scan caused by the horizontal deflection current is always kept without variations.

It is an object of this invention to provide a new and improved horizontal deflection circuit.

It is another object of this invention is to provide a horizontal deflection circuit in which a horizontal deflection current is stabilized against fluctuations of the frequency of a drive signal for a horizontal output switching device, thereby to keep a suitable horizontal size of a raster.

The above and other objects, features and advantages of the invention, will be apparent from the following description which is to be read in conjunction with the accompanying drawings.

BRIEF DISCRIPTION OF THE DRAWING

FIG. 1 is a shematic circuit diagram showing a horizontal deflection circuit according to one embodiment of this invention.

FIG. 2 is a graph to which reference will be made in explaining the operation of the circuit in FIG. 1.

DESCRIPTION OF THE PREFERRED EMBODIMENT

An embodiment of the horizontal deflection circuit according to the present invention will now be described with reference to FIG. 1.

In FIG. 1, numeral reference 1 shows inclusively horizontal output circuit composed in the conventional connecting manner of an input terminal 2 of a horizontal drive pulse, a horizontal output switching transistor 3, a damper diode 4, a capacitor 5 forming a retrace resonant circuit and horizontal output transformer 8 having a primary winding 8a and a secondary winding 8b. A horizontal deflection coil 6 is connected to the switching transistor 3 and a capacitor 7 serving for shape correction of a horizontal deflection current is connected in series to the horizontal deflection coil 6. A power source terminal 9 is provided at one end of the primary winding 8a.

In this embodiment of the invention a saturable reactor 10 is provided with a primary winding 10a connected in series to the horizontal deflection coil, for example, between the capacitor 7 and the ground, as shown in FIG. 1 and with a control winding 10b. ONE end of the control winding 10b is connected to a power source terminal 20 through the collector-emitter path of a NPN transistor 25 and a resistor 19, and the other end of the control winding 10b is grounded. A base electrode of the transistor 25 is connected to a collector electrode of a PNP transistor 15, an emitter electrode of which is connected to the connection point between the resistor 19 and the collector electrode of the transistor 25 through resistor 17.

The collector electrode of the transistor 15 is grounded through a resistor 23. Another PNP transistor 16 is provided in parallel with the transistor 15. That is, an emitter electrode of the transistor 16 is connected to the connection point between the resistor 19 and the collector electrode of the transistor 25 through a resistor 18 and a collector electrode of the transistor 16 is grounded through a resistor 24. A base electrode of the transistor 16 is connected to a connection point between a resistor 22 and a variable resistor 21 used for adjustment of the horizontal size of a raster. The series circuit of the variable resistor 21 and the resistor 22 is connected between the connection point between the collector electrode of the transistor 25 and the resistor 19, and the ground. Circuit including the transistors 15 and 16, which is inclusively shown with numeral reference 14, forms a detecting circuit, the operation of which will be explained later. One end of the secondary winding 8b of the horizontal output transformer 8 is grounded and the other end of that is connected to a rectifying circuit. The rectifying circuit is formed with a resistor 11, a diode 12 and a capacitor 13. The connection point between the diode 12 and a capacitor 13 is connected to an output terminal of a relatively low D.C. voltage (for example 18V), and also connected to a base electrode of the transistor 15. Further a vertical rate parabolic wave signal source 27 is connected to the base electrode of the transistor 25 through a capacitor 28.

The operation of the above described circuit will be explained hereinafter. When the switching transistor 3 is in the OFF state periodically in accordance with the horizontal drive signal supplied to its base electrode, a pulse is obtained at the collector electrode of the transistor 3. The relationship between the amplitude of the collector pulse and the frequency of the horizontal drive signal is shown in FIG. 2. As shown in FIG. 2, if the frequency of the horizontal drive signal decreases, the amplitude of the collector pulse becomes large. The voltage across the secondary winding 8b of the horizontal output transformer 8 has the value proportional to the amplitude of the collector pulse and this voltage is rectified and filtered by the diode 12 and the capacitor 13 so as to be a D.C. voltage. This D.C. voltage, which has the value proportional to the amplitude of the collector pulse of the transistor 3, is supplied to the base of the transistor 15 of the detecting circuit 14. In the detecting circuit 14, the base of the transistor 16 is connected to a reference voltage point between the variable resistor 21 and the resistor 22, so a D.C. potential at the collector electrode of the transistor 15 varies in reversely proportional to variations of the D.C. voltage supplied to the base electrode of the transistor 15. The D.C. potential at the collector electrode of the transistor 15, that is, the voltage across the resistor 23 is supplied to the base electrode of the transistor 25. This results in that a current flowing through the collector-emitter path of the transistor 25 is varied in proportional to the frequency of the horizontal drive signal. That is, when the frequency of the horizontal drive signal decreases, the amplitude of the collector pulse at the collector of the transistor 3 and, accordingly, the voltage across the secondary winding 8b of the transformer 8 become large in accordance with the relationship shown in FIG. 2 and further the D.C. voltage supplied to the base electrode of the transistor 15 increases. Consequently, the voltage across the resistor 23 becomes small and accordingly the current flowing through the collector-emitter path of the transistor 25 decreases. On the contrary, when the frequency of the horizontal drive signal increases, the current flowing through the collector-emitter path of the transistor 25 increases.

The current flowing through the collector-emitter path of the transistor 25 is supplied to the control winding 10b of the saturable reactor 10. So, when the frequency of the horizontal drive signal decreases, the current flowing through the control winding 10b of the saturable reactor 10 increases, thereby to increase the impedance of the primary winding 10a of the saturable reactor 10. Contrary when the frequency of the horizontal drive signal increases, the current flowing through the control winding 10b of the saturable reactor 10 decreases, thereby to decrease the impedance of the primary winding 10a of the saturable reactor 10. Since the primary winding 10a of the saturable reactor 10 is connected in series to the horizontal deflection coil, the horizontal deflection current flowing therethrough is controlled by the variations in the impedance of the primary winding 10a so as to keep a predetermined suitable value regardless of the variations in the frequency of the horizontal drive signal. That is, when the frequency of the horizontal drive signal decreases, the impedance of the primary winding 10a of the saturable reactor 10 increases as explained above and therefore the horizontal deflection current is prevented from the increase which is to be caused by the increase of the voltage of the pulse at the collector of the transistor 3. While, when the frequency of the horizontal drive signal increases, the impedance of the primary winding 10a of the saturable reactor 10 decreases and therefore the horizontal deflection current is also prevented from the decrease which is to be caused by the decrease of the collector pulse of the transistor 3.

As mentioned above, according to the horizontal deflection circuit of this invention, the horizontal deflection current is always constant in spite of the fluctuations of the frequency of the horizontal drive signal. Accordingly, the horizontal size of the raster made by the beam scan caused by the horizontal deflection current is kept in suitable against the fluctuations of the frequency of the horizontal drive signal.

Further, in the case that a vertical rate parabolic wave signal is supplied to the base of the transistor 25 from the source 27, the current flowing through the collector-emitter path of the transistor 25, namely, the current flowing through the control winding 10b of the saturable reactor 10 is modulated by the vertical rate parabolic wave signal and therefore the impedance of the primary winding 10a of the saturable reactor 10 varies also parabolically at the vertical rate. This variation of the impedance of the primary winding 10a of the saturable reactor 10 serves to vary the horizontal deflection current so as to compensate for so-called pincushion distortions of the raster.

What is claimed is:
1. A circuit arrangement for the horizontal deflection of a beam in a cathode ray tube comprising;
    a. switching means with an output circuit means,
    b. a horizontal deflection coil connected to said output circuit means,
    c. means for supplying with a horizontal drive signal to switching means,
    d. variable impedance means connected in series to said horizontal deflection coil,
    e. detecting means connected to said switching means for detecting the level of an output signal of said switching means, and
    f. control means connected between said detecting means and said variable impedance means for controlling the impedance of said variable impedance means in response to the detected output of said detecting means so as to prevent a horizontal deflection current flowing through said horizontal deflection coil from undersirable variations.

2. A circuit arrangement in accordance with claim 1, wherein said variable impedance means comprises a saturable reactor having a primary winding and a control winding, said primary winding being connected in series to said horizontal deflection coil and said control winding being connected to said control means.

3. A circuit arrangement in accordance with claim 1, wherein said output circuit means comprises a transformer having a primary winding connected to said switching means and a secondary winding connected to said detecting means for supplying an output signal of said switching means obtained thereat to said detecting means.

4. A circuit arrangement in accordance with claim 3, wherein said detecting means comprises a rectifying circuit for rectifying the output signal obtained at said secondary winding of the transformer and a comparing circuit connected to said rectifying circuit for comparing the output voltage of said rectifying circuit with a reference voltage.

5. A circuit arrangement in accordance with claim 4, wherein said control means comprises means for controlling a current flowing through said variable impedance means in response to the compared output of said comparing circuit.

6. A circuit arrangement in accordance with claim 1, further comprising a source of a parabolic wave signal of vertical frequency and means for controlling the impedance of said variable impedance means in response to said parabolic wave signal of vertical frequency so as to correct the side pincushion distortion.

* * * * *